May 24, 1966 S. A. MENCACCI 3,252,405
HYDROSTATIC COOKING APPARATUS
Filed Oct. 1, 1964 2 Sheets-Sheet 1
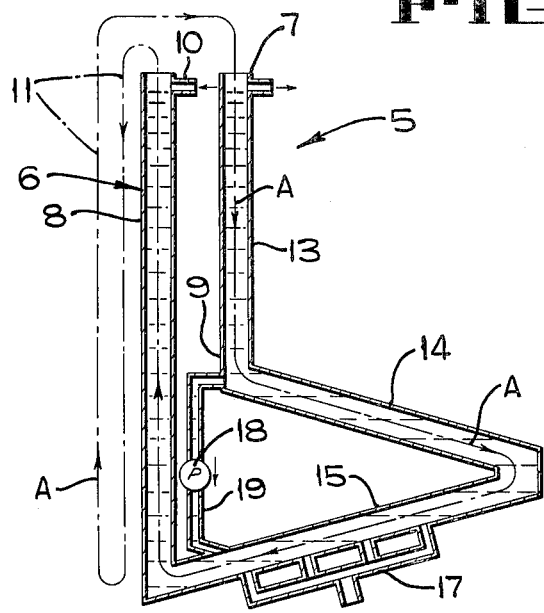
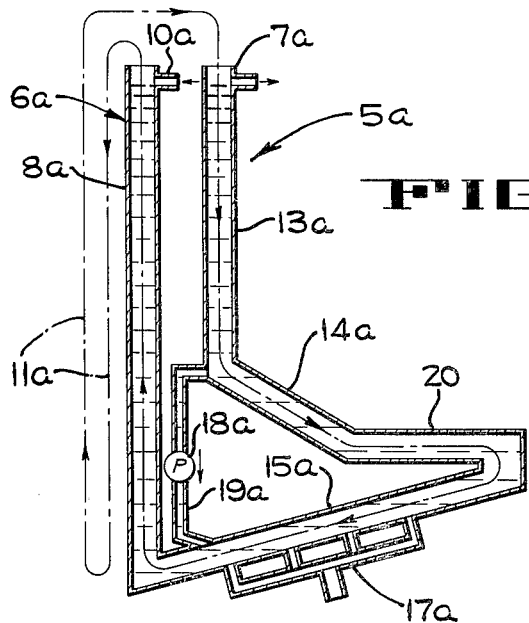
INVENTOR
SAMUEL A. MENCACCI
BY *Hans G. Hoffmeister*
ATTORNEY

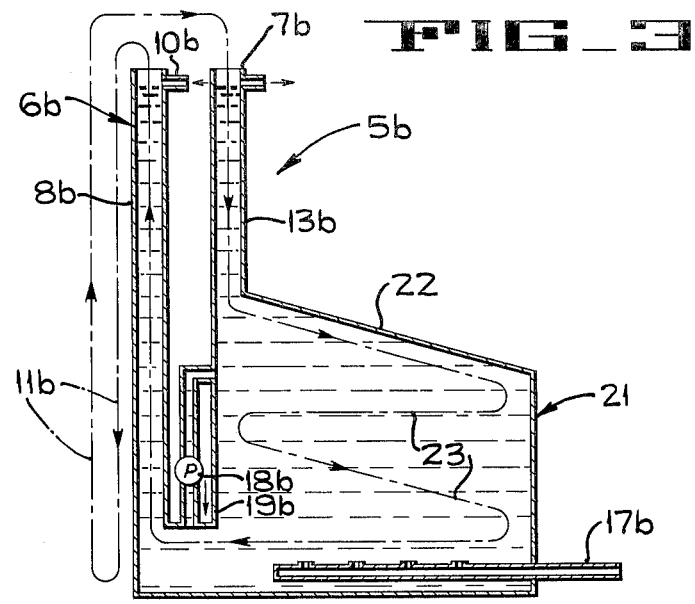
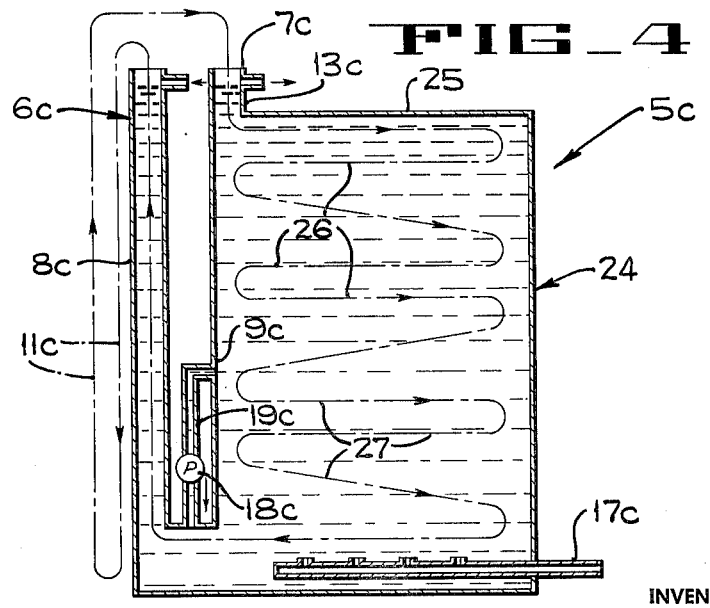

United States Patent Office 3,252,405
Patented May 24, 1966

3,252,405
HYDROSTATIC COOKING APPARATUS
Samuel A. Mencacci, Wilrijk, Antwerp, Belgium, assignor to International Machinery Corporation S.A., St. Nicolas-Waes, Belgium, a corporation of Belgium
Filed Oct. 1, 1964, Ser. No. 400,821
Claims priority, application Belgium, June 3, 1964, 648,756
3 Claims. (Cl. 99—362)

This invention relates to hydrostatic cooking apparatus of the kind comprising a generally U-shaped water-filled enclosure which is specifically adapted for the treatment of food products contained in glass jars, said glass jars being hermetically sealed with the aid of pressed-on covers firmly tightened on said glass jars.

Products packed in glass jars, such as baby foods, have received such a desirable acceptance by customers that it is almost essential for baby foods to be packed in glass jars for successful sales.

Usually, food products are first prepared, then filled into glass jars having covers firmly tightened on the jars, and subsequently the hermetically sealed jars are submitted to a cooking and sterilizing treatment. As the product within the jars expands due to the cooking and sterilizing operation, a substantial gas and vapor pressure is generated within the jars which pressure tends to dislodge the covers from the jars.

The common manner of treating food products packed in glass jars has been to treat the jars in pressure cookers in which compressed air has been applied above the surface of the water heating medium in the cooker in such a way as to provide an over-pressure to maintain the covers tightly fixed on the jars. However, with these cookers, it is not possible to gradually heat the treated product to the cooking or sterilizing temperature so that frequent glass breakage occurs.

It is, therefore, one object of the present invention to provide a cooking apparatus specifically arranged to gradually heat the jars to the sterilizing temperature and to thereafter gradually cool the jars from the sterilizing temperature to a suitable discharge temperature.

Another object is to provide a cooking apparatus for applying a sufficient pressure on the external surfaces of the jars to over-balance the pressure of gasses generated within the jars and to assure that the covers, such as pressed-on plastic covers, will remain hermetically sealed on the jars.

Another object is to provide a cooking apparatus having liquid circulating means for maintaining the temperature of the liquid in the sterilizing zone substantially constant.

Another object is to provide a cooking apparatus having means for moving jars through a liquid heating medium along a path which causes the pressure acting on the external surfaces of the jars to progressively increase as the jars move through the cooking or sterilizing chamber.

These and other objects and advantages of the present invention will become apparent from the following description and the accompanying drawings, in which:

FIGURES 1, 2, 3 and 4 are schematic vertical central sections taken through four different embodiments of the cooking apparatus of the present invention.

In general, the first embodiment of the cooking apparatus 5 (FIG. 1) of the present invention comprises a generally U-shaped housing 6 having an inlet water treatment leg 7 communicating with an outlet water cooling leg 8. The inlet leg 7 is filled with water which gradually increases in temperature from a temperature below the boiling point of water at atmospheric pressure at its upper end to a sterilizing temperature above said boiling point at a point 9 intermediate its upper and lower ends. This sterilizing temperature is maintained substantially constant from the point 9 to the lower end of the inlet leg 7. Cooling water is directed into the cooling leg 8 through a conduit 10 and gradually decreases in temperature from the sterilizing temperature at its lower end to a relatively cool temperature above the boiling point of water at its upper end. Jars filled with food products are carried by a continuously driven endless conveyor 11 (diagrammatically indicated by center lines in FIGURE 1) through the housing 6 in the direction of the arrows A.

More particularly, the inlet water treatment leg 7 of the cooking apparatus 5 (FIG. 1) comprises a vertical part 13, an outwardly and downwardly sloping part 14, and an inwardly and downwardly sloping part 15, said latter part joining the lower part of the cooling leg 8 of the generally U-shaped housing 6 of the cooking apparatus 5. The water contained in parts 14 and 15 is heated by means of steam injected into part 15 through a steam injector 17.

An important feature of the present invention is that water in parts 14 and 15 is maintained at a substantially constant sterilizing temperature by being circulated in a direction opposite to the movement of the conveyor 11 by means of a pump 18 which is included in a branch conduit 19. Although the water acting on the jars passing through the parts 14 and 15 is maintained at a substantially constant temperature, it will be understood that the contents of the jars will gradually increase in temperature as the jars move through parts 14 and 15 and, accordingly, the pressure of gas generated within the jars will gradually increase.

It will be noted that as the jars progress downwardly through the water at constant temperature in the parts 14 and 15, the pressure acting on the external surfaces of the jars gradually increases thereby over-balancing the increased pressure generated inside the jars assuring that the caps will remain sealed to the jars.

The height of the water column in part 13 is such as to permit heating of the water in parts 14 and 15 to a temperature above 212° F. without attaining the boiling point of water at the hydraulic pressure acting at point 9. The slope of the parts 14 and 15 is determined on the basis of certain parameters such as: the height of the water column, the desired speed of the conveyor, the relationship between the increase of pressure within the jars and the rise of temperature, and the expansion or dilatation of the covers with respect to that of the glass jars so as to insure that the covers will remain tightly pressed on the jars throughout the cooking process.

When processing certain products in glass jars, it is desirable to cook the products under a constant pressure for a given period. Accordingly, the second embodiment 5a (FIG. 2) of the cooking apparatus of the present invention illustrates an apparatus adapted to handle such products. Since the second embodiment of the apparatus is quite similar to the first embodiment, parts of the second embodiment which are similar to parts of the first embodiment will be assigned the same numerals followed by the letter "a," and only those parts which differ from parts of the first embodiment of the invention will be described.

In order to cook the food products by a heating medium maintained at substantially constant pressure as well as at a constant temperature, a horizontal part 20 is included between the sloping parts 14a and 15a as clearly illustrated in FIGURE 2.

The embodiments of the invention illustrated in FIGURES 3 and 4 illustrate cooking apparatus 5b and 5c, respectively, which are adapted to handle products requiring slow cooking treatment as well as high production rates. The numerals followed by the letters "b" and "c" will be assigned to parts of the cooking apparatus 5b and 5c, respectively, which parts are similar to those disclosed in the first embodiment of the invention.

The cooking apparatus 5b (FIG. 3) substitutes a cooking chamber 21 having a downwardly and outwardly sloping upper wall 22 for the parts 14 and 15 of the first embodiment of the invention so that the conveyor 11b may move the jars through the chamber 21 along a zig-zag path 23 which may include several horizontal runs as well as several downwardly sloping runs.

The cooking apparatus 5c (FIG. 4) comprises a housing 24 which has a horizontal upper wall 25 and extends substantially to the top of the part 13c so as to accommodate several zig-zag runs 26 of the conveyor 11c above the point 9c in the preheating or tempering zone of the housing 24, as well as to accommodate several similar zig-zag runs 27 below the point 9c in the sterilizing zone wherein the temperature is maintained substantially constant by water being recirculated through the conduit 19c by the pump 18c.

It will be noted that in all embodiments of the invention the pressure acting on the external surfaces of the jars during the preheating and cooking process is at all times either increasing or maintained constant for a short interval of time, and does not decrease until the temperature is gradually reduced as the jars move upwardly in the cooling leg 8. By maintaining a constant or constantly increasing pressure on the caps, there is no tendency for the jars to "breathe," i.e., deflect outwardly and inwardly relative to the jars, as would occur if the pressure acting on the external surfaces of the jars alternately increase and decreased during the cooking operation.

From the foregoing description it is apparent that the cooking apparatus of the present invention includes water legs of sufficient height arranged to gradually raise the temperature of glass jars prior to cooking, and to gradually cool the jars after cooking while maintaining an external pressure on the jars sufficient to over-balance all internal pressures generated within the jars by the heated product. The cooking apparatus also includes means for recirculating the water in the lower end of the inlet water leg to provide a sterilizing zone having a substantially constant cooking or sterilizing temperature therein.

While several embodiments of the present invention have been shown and described, it will be understood that various changes and modifications may be made therein without departing from the spirit of the invention or the scope of the appended claims.

Having thus described the present invention, what is claimed as new and desired to be protected by Letters Patent is:

1. Apparatus for cooking products packed in sealed glass jars under pressure and subsequently cooling the jars, comprising a vertically elongated heat treatment housing defining a water filled preheating zone disposed above and communicating with a water filled sterilizing zone, a vertically elongated cooling housing filled with cooling water and communicating at its lower end with said head treatment housing, means for advancing jars along a predetermined path into and through said heat treatment housing and out said cooling housing, means for heating the water in the sterilizing zone of said heat treatment housing to a temperature above that of the boiling point of water at atmospheric pressure, and means disposed externally of and having an inlet port communicating with the interior of said heat treatment housing near the upper end of said sterilizing zone and a discharge port communicating with the interior of said heat treatment housing near the lower end of said sterilizing zone for recirculating the water from the upper portion of said sterilizing zone to the lower portion of said zone in a direction opposite to that of the movement of the jars through said zone so as to maintain the temperature in said sterilizing zone substantially constant, said vertical elongated housings being of sufficient height to exert a pressure on the external surfaces of the jars which at all times exceeds the pressure of gases generated within the jars by the heated product.

2. An apparatus according to claim 1 wherein said jar advancing means restricts the movement of the jars at all times while in said elongated heat treatment housing and prior to reaching the discharge port of said recirculating means to downward movement so that the pressure acting on the external surfaces of the jars moving through the heat treatment housing progressively increases in direct proportion to the increase of pressure within the jars until such time as the jars move beyond said discharge port and subsequently enter and move upwardly through the cooling water in said cooling housing.

3. Apparatus for cooking under pressure and subsequently cooling of food products packed and sealed in glass jars with pressed-on covers, comprising a water filled generally U-shaped enclosure having two vertically extending legs, one of said legs being arranged to form the effective treating section, said one leg comprising successively a vertical part, at least one outwardly and downwardly sloping part, and at least one inwardly and downwardly sloping part, said latter part joining the lower part of the second leg of said U-shaped enclosure; said outwardly and downwardly sloping part and said inwardly and downwardly sloping part cooperating to define a sterilizing zone, endless conveyor means passing through said U-shaped enclosure; means for directing hot steam into the lower one of said sloping parts so as to heat the water in both of said sloping parts from a point adjacent the upper end of said first sloping part downwardly to a point near the lower end of said second sloping part to a temperature exceeding 212° F. but less than that of the boiling point of water under the pressure acting thereon, said pressure being sufficient for maintaining said covers tightly on said jars, the speed of movement of said conveyor means being determined in accordance with the desired cycle time of the treatment; and recirculating means disposed externally of and having an inlet port communicating with the upper end of said outwardly and downwardly sloping part and having a discharge port communication with the lower end of said inwardly and downwardly sloping part for recirculating the water from the upper portion of said sterilizing zone to the lower portion of said zone in a direction opposite to the direction of movement of the jars through said sterilizing zone whereby the temperature of the water is maintained substantially constant in said sloping parts thereby causing the pressure inside said jars and the water pressure externally of said jars to increase at substantially the same rate while in said sloping parts and until said jars are moved past said discharge port.

References Cited by the Examiner

UNITED STATES PATENTS

| | | | |
|---|---|---|---|
| 782,878 | 2/1905 | Ruff | 99—362 |
| 1,584,397 | 5/1926 | Paxton | 99—362 X |
| 1,987,414 | 1/1935 | Omsted | 99—362 |
| 2,660,512 | 11/1953 | Webster | 21—56 |
| 2,695,555 | 11/1954 | Carvallo | 99—362 |
| 2,701,205 | 2/1955 | Ekelund | 99—214 |
| 2,710,260 | 6/1955 | Reed | 99—214 |
| 2,719,478 | 10/1955 | Van Der Winden | 99—360 |
| 2,760,873 | 8/1956 | Munz | 99—214 |
| 2,794,385 | 6/1957 | Inghram | 99—360 |
| 2,806,423 | 9/1957 | Van Der Winden | 99—362 |

OTHER REFERENCES 791,672    3/1958    Great Britain.

WILLIAM I. PRICE, *Primary Examiner.*

BILLY J. WILHITE, *Examiner.*